United States Patent
Jung

(10) Patent No.: US 9,678,308 B2
(45) Date of Patent: Jun. 13, 2017

(54) OPTICAL SYSTEM

(71) Applicant: Samsung Electro-Mechanics Co., Ltd., Suwon-si (KR)

(72) Inventor: Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 163 days.

(21) Appl. No.: 14/665,156

(22) Filed: Mar. 23, 2015

(65) Prior Publication Data

US 2016/0124190 A1 May 5, 2016

(30) Foreign Application Priority Data

Oct. 31, 2014 (KR) .................. 10-2014-0150719

(51) Int. Cl.
*G02B 9/60* (2006.01)
*G02B 13/00* (2006.01)

(52) U.S. Cl.
CPC ............ *G02B 13/0045* (2013.01); *G02B 9/60* (2013.01)

(58) Field of Classification Search
CPC ..... G02B 13/0045; H02B 9/60; H04N 5/2254
See application file for complete search history.

(56) References Cited

U.S. PATENT DOCUMENTS

| | | | |
|---|---|---|---|
| 8,035,723 B2 | 10/2011 | Sano et al. | |
| 8,508,859 B2 | 8/2013 | Tsai et al. | |
| 9,146,385 B2 * | 9/2015 | Chae | G02B 13/004 |
| 9,223,118 B2 * | 12/2015 | Mercado | H04N 5/23212 |
| 9,316,815 B2 * | 4/2016 | Chen | G02B 9/62 |
| 2011/0316969 A1 | 12/2011 | Hsieh et al. | |
| 2012/0087020 A1 | 4/2012 | Tang et al. | |
| 2012/0188655 A1 | 7/2012 | Tsai et al. | |

(Continued)

FOREIGN PATENT DOCUMENTS

| | | |
|---|---|---|
| CN | 102608731 A | 7/2012 |
| JP | 2009-294527 A | 12/2009 |

(Continued)

OTHER PUBLICATIONS

Korean Office Action issued on Feb. 5, 2016 in counterpart Korean Application No. 10-2014-0150719 (11 pages in Korea with English translation).

(Continued)

*Primary Examiner* — Amy Hsu
(74) *Attorney, Agent, or Firm* — NSIP Law

(57) ABSTRACT

An optical system includes: a first lens having refractive power and comprising an object-side surface which is convex in a paraxial region; a second lens having refractive power and comprising an object-side surface which is convex in the paraxial region; a third lens having refractive power; a fourth lens having refractive power; and a fifth lens having refractive power. The first to fifth lenses are sequentially disposed from an object side. An Abbe number of the first lens is between 30 and 50. Deteriorations in resolution at high temperatures and/or low temperatures may be decreased, MTF performance may be maintained even during temperature changes, and changes in focusing positions may be decreased. In addition, an aberration improvement effect, a wide field of view and a high degree of resolution may be implemented.

38 Claims, 12 Drawing Sheets

(56) References Cited

U.S. PATENT DOCUMENTS

| | | | |
|---|---|---|---|
| 2013/0258499 A1* | 10/2013 | Hashimoto | G02B 13/0045 359/714 |
| 2013/0314803 A1 | 11/2013 | Huang et al. | |
| 2014/0063618 A1* | 3/2014 | Park | G02B 13/18 359/713 |
| 2014/0104703 A1* | 4/2014 | Jo | G02B 9/60 359/714 |
| 2014/0139933 A1* | 5/2014 | Chen | G02B 9/60 359/714 |
| 2014/0160343 A1* | 6/2014 | You | G02B 13/0045 348/335 |
| 2014/0204478 A1* | 7/2014 | Asami | G02B 13/06 359/752 |
| 2014/0376105 A1* | 12/2014 | Sekine | G02B 3/04 359/708 |
| 2015/0160439 A1* | 6/2015 | Tsai | G02B 9/60 359/714 |
| 2015/0219879 A1 | 8/2015 | Zhao et al. | |

FOREIGN PATENT DOCUMENTS

| | | |
|---|---|---|
| JP | 2011-85733 A | 4/2011 |
| JP | 2014-35396 A | 2/2014 |
| KR | 10-2015-0091695 A | 8/2015 |
| TW | 201200900 A1 | 1/2012 |
| TW | 201232085 A1 | 8/2012 |
| TW | 201237455 A1 | 9/2012 |

OTHER PUBLICATIONS

Taiwanese Office Action issued on Dec. 6, 2016 in counterpart Taiwanese Application No. 104109867. (26 pages in Chinese with English Translation).

\* cited by examiner

| Surface | Radius | Thickness | Index | Abbe |
|---|---|---|---|---|
| 1 | 2.029 | 0.530 | 1.743 | 49.2 |
| 2 | 16.319 | 0.080 | | |
| 3 | 7.316 | 0.270 | 1.635 | 24 |
| 4 | 2.112 | 0.229 | | |
| 5 | 19.867 | 0.873 | 1.544 | 56.1 |
| 6 | −1.655 | 0.318 | | |
| 7 | −0.640 | 0.370 | 1.635 | 24 |
| 8 | −1.030 | 0.080 | | |
| 9 | 1.795 | 1.000 | 1.544 | 56.1 |
| 10 | 1.808 | 0.300 | | |
| 11 | Infinity | 0.210 | 1.517 | 64.2 |
| 12 | Infinity | 0.582 | | |
| Image | Infinity | | | |

FIG. 3

| surface# | 1 | 2 | 3 | 4 | 5 | 6 | 7 | 8 | 9 | 10 |
|---|---|---|---|---|---|---|---|---|---|---|
| Conic Constant (K) | -0.387534 | 0 | 0 | 4.240041 | 0 | 0 | -2.91313 | -1.04911 | -17.561 | -8.17631 |
| 4th Order Coefficient (A) | -0.002919 | -0.05107 | -0.09769 | -0.096068 | -0.074983 | -0.047654 | -0.30467 | 0.02325 | -0.14087 | -0.04553 |
| 6th Order Coefficient (B) | 0.0062716 | 0.1102244 | 0.3820336 | 0.1335101 | 0.0132011 | -0.05978 | 0.253868 | 0.044513 | 0.067217 | 0.010899 |
| 8th Order Coefficient (C) | -0.02149 | -0.308067 | -1.16988 | -0.07915 | -0.018866 | 0.0590864 | 0.034393 | 0.001248 | -0.0438 | -0.00322 |
| 10th Order Coefficient (D) | -0.0108521 | 0.6374086 | 2.6956561 | -0.14649 | 0.0977791 | 0.1049047 | -0.02523 | -0.00265 | 1.59E-02 | 0.00467 |
| 12th Order Coefficient (E) | 0.0428815 | -0.758877 | -3.075013 | -0.024129 | 0.0044482 | -0.132193 | -0.06333 | -0.00335 | -0.00174 | -2.45E-05 |
| 14th Order Coefficient (F) | -0.041462 | 0 | 0 | 0 | -0.042918 | 0.0377381 | 0.029168 | 0.001286 | 0 | 0.00E+00 |

FIG. 4

| Surface | Radius | Thickness | Index | Abbe |
|---|---|---|---|---|
| 1 | 2.364 | 0.530 | 1.743 | 49.2 |
| 2 | -116.270 | 0.080 | | |
| 3 | 9.688 | 0.300 | 1.635 | 24 |
| 4 | 2.368 | 0.255 | | |
| 5 | -180.000 | 0.800 | 1.544 | 56.1 |
| 6 | -1.643 | 0.395 | | |
| 7 | -0.647 | 0.370 | 1.635 | 24 |
| 8 | -0.988 | 0.080 | | |
| 9 | 1.907 | 1.000 | 1.544 | 56.1 |
| 10 | 1.833 | 0.321 | | |
| 11 | Infinity | 0.210 | 1.517 | 64.2 |
| 12 | Infinity | 0.582 | | |
| Image | Infinity | | | |

FIG. 7

| surface# | 1 | 2 | 3 | 4 | 5 | 6 | 7 | 8 | 9 | 10 |
|---|---|---|---|---|---|---|---|---|---|---|
| Conic Constant (K) | -0.879255 | 0 | 0 | 4.7327799 | 0 | 0 | -2.66749 | -1.13866 | -17.56 | -8.17631 |
| 4th Order Coefficient (A) | -0.009032 | -0.047858 | -0.082406 | -0.102821 | -0.106205 | -0.075705 | -0.30319 | 0.03082 | -0.08829 | -0.03262 |
| 6th Order Coefficient (B) | 0.0064522 | 0.1035215 | 0.3922788 | 0.1576554 | 0.0055093 | -0.056014 | 0.271236 | 0.040187 | 0.023394 | 0.004313 |
| 8th Order Coefficient (C) | -0.042641 | -0.30733 | -1.307771 | -0.199567 | -0.013019 | 0.0805386 | -0.01004 | -0.00512 | -0.01791 | -0.00136 |
| 10th Order Coefficient (D) | 0.026828 | 0.629174 | 2.921249 | 0.1327105 | 0.0373048 | 0.0354623 | -0.03383 | -0.0013 | 6.63E-03 | 0.000211 |
| 12th Order Coefficient (E) | 0.0062717 | -0.758877 | -3.075013 | -0.163354 | 0.1465281 | -0.093138 | -0.03691 | -0.00429 | -0.00073 | -1.11E-05 |
| 14th Order Coefficient (F) | -0.027181 | 0 | 0 | 0 | -0.117261 | 0.0377381 | 0.021275 | 0.001849 | 0 | 0.00E+00 |

FIG. 8

| Surface | Radius | Thickness | Index | Abbe |
|---|---|---|---|---|
| 1 | 1.842 | 0.441 | 1.744 | 44.9 |
| 2 | 3.061 | 0.176 | | |
| 3 | 2.615 | 0.250 | 1.635 | 24 |
| 4 | 1.826 | 0.141 | | |
| 5 | 10.421 | 0.755 | 1.544 | 56.1 |
| 6 | -1.313 | 0.277 | | |
| 7 | -0.552 | 0.370 | 1.635 | 24 |
| 8 | -0.868 | 0.050 | | |
| 9 | 1.817 | 1.012 | 1.544 | 56.1 |
| 10 | 1.810 | 0.293 | | |
| 11 | Infinity | 0.210 | 1.517 | 64.2 |
| 12 | Infinity | 0.621 | | |
| Image | Infinity | | | |

FIG. 11

| surface # | 1 | 2 | 3 | 4 | 5 | 6 | 7 | 8 | 9 | 10 |
|---|---|---|---|---|---|---|---|---|---|---|
| Conic Constant (K) | 0.1593395 | 0 | 0 | 1.6335534 | 0 | 0 | -2.30372 | -1.25258 | -17.56 | -8.17631 |
| 4th Order Coefficient (A) | 0.0111937 | -0.053695 | -0.329511 | -0.231882 | -0.002744 | -0.000978 | -0.247721 | 0.042947 | -0.119995 | -0.04138 |
| 6th Order Coefficient (B) | 0.0417311 | 0.0346801 | 0.0663175 | -0.039234 | 0.0358964 | -0.012068 | 0.311496 | 0.058577 | 0.039359 | 0.000953 |
| 8th Order Coefficient (C) | -0.084959 | -0.180167 | -1.007541 | 0.057887 | 0.049723 | 0.0676656 | 0.036812 | 0.02864 | -0.01955 | -0.00259 |
| 10th Order Coefficient (D) | 0.083244 | 0.3173935 | 2.3830974 | -0.057333 | 0.0435537 | 0.1129452 | -0.04597 | -0.00036 | 6.42E-03 | 0.000359 |
| 12th Order Coefficient (E) | -0.035531 | -0.758877 | -3.075013 | -0.039212 | -0.060421 | -0.118976 | -0.07363 | -0.00319 | -0.00072 | -2.32E-05 |
| 14th Order Coefficient (F) | -0.064899 | 0 | 0 | 0 | 0.030743 | 0.0491104 | 0.0394 | 0.000323 | 0 | 0.00E+00 |

FIG. 12

OPTICAL SYSTEM

CROSS-REFERENCE TO RELATED APPLICATION

This application claims priority to and benefit of Korean Patent Application No. 10-2014-0150719, filed on Oct. 31, 2014, with the Korean Intellectual Property Office, the disclosure of which is incorporated in its entirety herein by reference.

BACKGROUND

Some embodiments of the present disclosure may relate to an optical system.

Recently, mobile communications terminals have commonly been provided with camera modules, enabling image capturing and video calling. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in obtaining camera modules having high levels of resolution and high degrees of performance.

In order to resolve such issues, recently, camera lenses have been formed of plastic, a material lighter than glass, and lens modules have been configured of five or more lenses to achieve high degrees of resolution.

SUMMARY

An aspect of the present disclosure may provide an optical system in which an aberration improvement effect, a high degree of resolution, and/or a wide field of view may be implemented.

An aspect of the present disclosure may also provide an optical system capable of decreasing deteriorations in resolution at high temperatures and/or low temperatures, maintaining modulation transfer function (MTF) performance even during temperature changes, and decreasing changes in focusing positions.

According to an aspect of the present disclosure, an optical system may include: a first lens having refractive power and comprising an object-side surface which is convex in a paraxial region; a second lens having refractive power and comprising an object-side surface which is convex in the paraxial region; a third lens having refractive power; a fourth lens having refractive power; and a fifth lens having refractive power. The first to fifth lenses may be sequentially disposed from an object side to an image side. An Abbe number of the first lens may be between 30 and 50. For example, deteriorations in resolution at high temperatures and/or low temperatures may be decreased, MTF performance may be maintained even during temperature changes, and changes in focusing positions may be decreased. In addition, an aberration improvement effect, a wide field of view and a high degree of resolution may be realized.

Other embodiments are also described. The above summary does not include an exhaustive list of all aspects of the present invention. It is contemplated that the invention includes all optical systems that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF DRAWINGS

The above and other aspects, features and advantages of the present disclosure will be more clearly understood from the following detailed description taken in conjunction with the accompanying drawings, in which:

FIG. 3 is a table showing characteristics of lenses in the optical system illustrated in FIG. 1;

FIG. 4 is a table showing aspherical surface coefficients of lenses in the optical system illustrated in FIG. 1;

FIG. 7 is a table showing characteristics of lenses in the optical system illustrated in FIG. 5;

FIG. 8 is a table showing aspherical surface coefficients of lenses in the optical system illustrated in FIG. 5;

FIG. 11 is a table showing characteristics of lenses in the optical system illustrated in FIG. 9; and FIG. 12 is a table showing aspherical surface coefficients of lenses in the optical system illustrated in FIG. 9.

DETAILED DESCRIPTION

Figure 1:
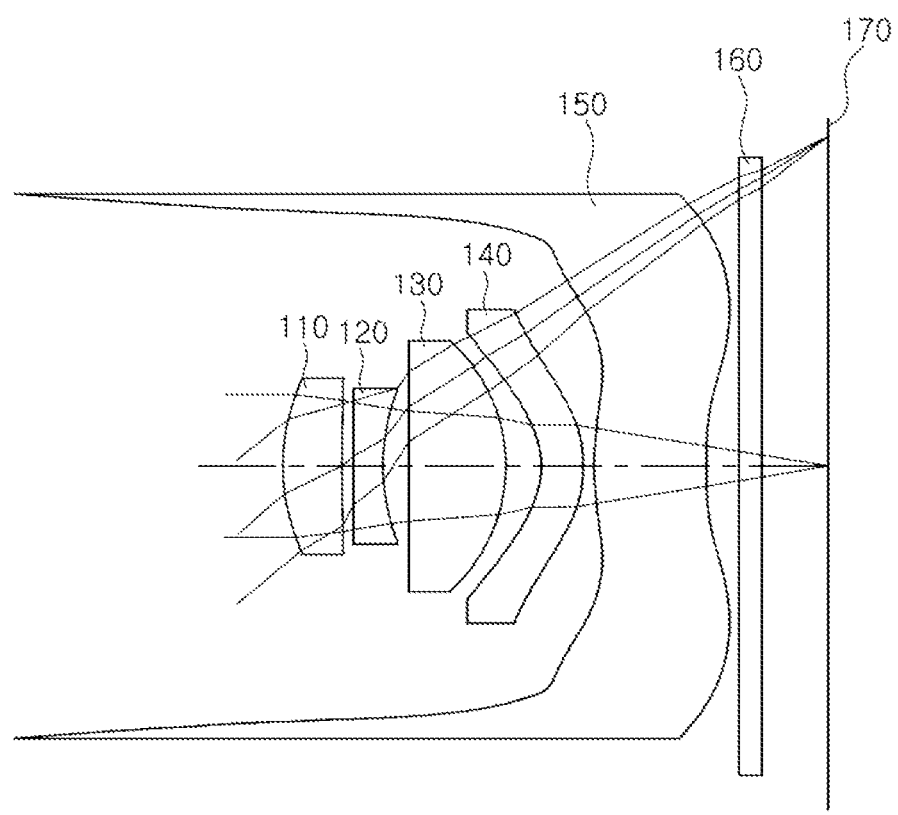
FIG. 1 is a view of an optical system according to a first exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

In the drawings, the thicknesses, sizes, and shapes of lenses have been slightly exaggerated for convenience of explanation. Particularly, the shapes of spherical surfaces and aspherical surfaces are illustrated byway of example, but are not limited to those illustrated in the drawings.

In the present specification, a first lens refers to a lens closest to an object, and a fifth lens refers to a lens closest to an image sensor.

In addition, a first surface of each lens refers to a surface thereof closer to or facing the object side (or an object-side surface) and a second surface of each lens refers to a surface thereof closer to or facing the image side (or an image-side surface). Furthermore, unless otherwise indicated herein, in embodiments of the present disclosure, numerical values of radii of curvature, thicknesses, and the like, of lenses may be represented by millimeters (mm).

In addition, a paraxial region may refer to a very narrow region on an optical axis and/or in the vicinity of an optical axis.

An optical system according to exemplary embodiments in the present disclosure may include five or more lenses.

That is, the optical system may include a first lens, a second lens, a third lens, a fourth lens, and a fifth lens.

However, the optical system is not limited to including only five lenses, and may further include other components or additional one or more lenses, if necessary. For example, the optical system may include a stop for controlling an amount of light. In addition, the optical system may further include an infrared cut-off filter filtering infrared light. Additionally, the optical system may further include an image sensor converting an image of a subject incident on the image sensor into electrical signals. Further, the optical system may further include a gap maintaining member adjusting gaps between lenses.

In the optical system according to some exemplary embodiments, the first lens may be formed of glass, and at least one or more of the second to fifth lenses may be formed of plastic. However, the first lens may be formed of plastic, and/or at least one or more of the second to fifth lenses may be formed of glass.

Further, at least one or both of an object-side surface and an image-side surface of the first lens may be aspherical.

Further, at least one or more of the first to fifth lenses may have an aspherical surface. Further, each of the first to fifth lenses may have at least one or both aspherical surface.

That is, at least one or both of first and second surfaces of the first to fifth lenses may be aspherical. Here, the aspherical surfaces of the first to fifth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad [\text{Equation 1}]$$

Here, c is a curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients and, Z is a distance between the certain point on the aspherical surface at the distance Y and a tangential plane meeting the apex of the aspherical surface of the lens.

The optical system including the first to fifth lenses may have lenses having, for example, but not limited to, positive refractive power, negative refractive power, positive refractive power, negative refractive power and positive refractive power, sequentially from the object side, respectively.

For example, some embodiments of the optical system configured as described above may improve optical performance through aberration improvement. In addition, some embodiments of the optical system configured as described above may decrease deteriorations in resolution at high temperatures and/or low temperatures, by using the first lens formed of glass.

In addition, some embodiments of the optical system configured as described above may maintain modulation transfer function (MTF) performance even during temperature changes and decrease changes in focusing positions, by using the first lens formed of glass.

The optical system according to exemplary embodiments may satisfy Conditional Expression 1.

$$30 < v1 < 50 \quad [\text{Conditional Expression 1}]$$

Here, v1 is an Abbe number of the first lens.

The optical system according to exemplary embodiments may satisfy Conditional Expression 2.

$$f5/f1 > 0.3 \quad [\text{Conditional Expression 2}]$$

Here, f1 is a focal length of the first lens, and f5 is a focal length of the fifth lens.

In some embodiments of the present disclosure, f5/f1 may be out of the range of Conditional Expression 2, but refractive power of the fifth lens may be relatively strong, causing difficulty in securing resolution of a peripheral portion of an image.

The optical system according to exemplary embodiments may satisfy Conditional Expression 3.

$$-20 < v1 - v3 < -5 \quad [\text{Conditional Expression 3}]$$

Here, v1 is the Abbe number of the first lens, and v3 is an Abbe number of the third lens.

In some embodiments of the present disclosure, v1-v3 may be out of the range of Conditional Expression 3, but it may be difficult to correct chromatic aberration, causing difficulty in achieving high resolution.

The optical system according to exemplary embodiments may satisfy Conditional Expression 4.

$$Th2/Th5 < 0.4 \quad [\text{Conditional Expression 4}]$$

Here, Th2 is a thickness of the second lens in the paraxial region, and Th5 is a thickness of the fifth lens in the paraxial region.

In some embodiments of the present disclosure, Th2/Th5 may be out of the range of Conditional Expression 4, but it may be difficult to correct aberrations when imaging a relatively close object, causing difficulty in achieving high resolution.

The optical system according to exemplary embodiments may satisfy Conditional Expression 5.

$$1.0 < OAL/EFL < 2.0 \quad [\text{Conditional Expression 5}]$$

Here, OAL is a distance from the object-side surface of the first lens to an imaging surface of the image sensor, and EFL is an overall focal length of the optical system including the first to fifth lenses.

In some embodiments of the present disclosure, OAL/EFL may be out of the range of Conditional Expression 5, but a field of view of the optical system may be narrow, and it may be difficult to allow the optical system to be relatively slim.

The optical system according to exemplary embodiments may satisfy Conditional Expression 6.

$$0.2 < Th5/EFL < 0.4 \quad [\text{Conditional Expression 6}]$$

Here, Th5 is the thickness of the fifth lens in the paraxial region, and EFL is the overall focal length of the optical system including the first to fifth lenses.

In some embodiments of the present disclosure, Th5/EFL may be out of the range of Conditional Expression 6, but distortion aberration may be increased, causing difficulty in securing resolution of the peripheral portion of the image due to curvature of the imaging surface.

The optical system according to exemplary embodiments may satisfy Conditional Expression 7.

$1.70 < n1 < 2.10$ [Conditional Expression 7]

Here, n1 is a refractive index of the first lens.

In some embodiments of the present disclosure, n1 may be out of the range of Conditional Expression 7, but it may be difficult to correct chromatic aberration, causing difficulty in achieving high resolution.

The optical system according to exemplary embodiments may satisfy Conditional Expression 8.

$0.5 < r1/EFL < 0.7$ [Conditional Expression 8]

Here, r1 is a radius of curvature of the object-side surface of the first lens, and EFL is the overall focal length of the optical system including the first to fifth lenses.

The optical system according to exemplary embodiments may satisfy Conditional Expression 9.

$0.5 < EFL/f1 < 1.2$ [Conditional Expression 9]

Here, f1 is the focal length of the first lens, and EFL is the overall focal length of the optical system including the first to fifth lenses.

The optical system according to exemplary embodiments may satisfy Conditional Expression 10.

$1 < f1/f3 < 2.5$ [Conditional Expression 10]

Here, f1 is the focal length of the first lens, and f3 is the focal length of the third lens.

The optical system according to exemplary embodiments may satisfy Conditional Expression 11.

$0.8 < EFL/f1 + |EFL/f2| < 1.9$ [Conditional Expression 11]

Here, EFL is the overall focal length of the optical system, f1 is the focal length of the first lens, and f2 is a focal length of the second lens.

The optical system according to exemplary embodiments may satisfy Conditional Expression 12.

$75 < FOV < 90$ [Conditional Expression 12]

Here, FOV is a field of view of the optical system. Here, the field of view of the optical system is represented by degrees.

Next, the first to fifth lenses configuring the optical system according to exemplary embodiments will be described.

The first lens may have positive refractive power. However, the first lens may have negative refractive power. In addition, the first lens may have a meniscus shape. An object-side surface of the first lens may be convex. For example, a first surface of the first lens may be convex in the paraxial region, and/or a second surface of the first lens may be concave in the paraxial region.

Alternatively, both surfaces of the first lens may be convex. For instance, the first and second surfaces of the first lens may be convex in the paraxial region.

At least one or both of the first and second surfaces of the first lens may be aspherical. For example, both surfaces of the first lens may be aspherical.

The second lens may have negative refractive power. However, the second lens may have positive refractive power. In addition, the second lens may have a meniscus shape. An object-side surface of the second lens may be convex. For instance, a first surface of the second lens may be convex in the paraxial region, and/or a second surface of the second lens may be concave in the paraxial region.

At least one or both of the first and second surfaces of the second lens may be aspherical. For example, both surfaces of the second lens may be aspherical.

The third lens may have positive refractive power. However, the third lens may have negative refractive power. In addition, both surfaces of the third lens may be convex. For example, first and second surfaces of the third lens may be convex in the paraxial region.

Alternatively, the third lens may have a meniscus shape in which an image-side surface is convex. For instance, the first surface of the third lens may be concave in the paraxial region, and the second surface of the third lens may be convex in the paraxial region.

At least one or both of the first and second surfaces of the third lens may be aspherical. For example, both surfaces of the third lens may be aspherical.

The fourth lens may have negative refractive power. However, the fourth lens may have positive refractive power. In addition, the fourth lens may have a meniscus shape. An image-side surface of the fourth lens may be convex. For instance, a first surface of the fourth lens may be concave in the paraxial region, and a second surface of the fourth lens may be convex in the paraxial region.

At least one or both of the first and second surfaces of the fourth lens may be aspherical. For example, both surfaces of the fourth lens may be aspherical.

The fifth lens may have negative refractive power. However, the fifth lens may have positive refractive power. In addition, the fifth lens may have a meniscus shape. An object-side surface of the fifth lens may be convex. For example, a first surface of the fifth lens may be convex in the paraxial region, and/or a second surface of the fifth lens may be concave in the paraxial region.

At least one or both of the first and second surfaces of the fifth lens may be aspherical. For example, both surfaces of the fifth lens may be aspherical.

In addition, the fifth lens may have at least one inflection point formed on at least one or more of the first and/or second surfaces thereof. For example, the second surface of the fifth lens may be concave in the paraxial region and become convex at an edge thereof.

Here, the stop may be disposed between the first and second lenses. Therefore, sensitivity to a decenter (a phenomenon that optical axes of lenses are non-aligned) tolerance may be decreased. However, the stop may be disposed in front of the first lens or anywhere between the second lens and the fifth lens.

In addition, the first lens maybe formed of, for example, but not limited to, glass, whereby deteriorations in resolution at high temperatures and/or low temperatures may be decreased. That is, the first lens is formed of glass, whereby MTF performance may be maintained even during temperature changes and changes in focusing positions may be decreased.

In addition, in the optical system configured as described above, a plurality of lenses may perform an aberration correction function, whereby aberration performance may be improved.

An optical system according to a first exemplary embodiment in the present disclosure will be described with reference to FIGS. 1 through 4.

The optical system according to the first exemplary embodiment may include a first lens 110, a second lens 120, a third lens 130, a fourth lens 140, and a fifth lens 150, and may further include a stop, an infrared cut-off filter 160, and an image sensor 170.

For example, as illustrated in Table 1 (shown below), a focal length (f1) of the first lens 110 may be 3.053 mm, a focal length (f2) of the second lens 120 may be −4.726 mm, a focal length (f3) of the third lens 130 may be 2.836 mm, a focal length (f4) of the fourth lens 140 may be −4.188 mm, a focal length (f5) of the fifth lens 150 may be 16.230 mm, and an overall focal length (EFL) of the optical system may be 3.42 mm.

In addition, an Abbe number (v1) of the first lens 110 may be 49.2, f5/f1 may be 5.315226, v1-v3 may be −6.9, Th2/Th5 may be 0.27, OAL/EFL may be 1.4157149, Th5/f may be 0.292, a refractive index (n1) of the first lens 110 maybe 1.743, r1/EFL may be 0.5932105, EFL/f1 may be 1.1200328, f1/f3 may be 1.0768419, and EFL/f1+|EFL/f2| may be 1.8436945.

TABLE 1

| | |
|---|---|
| f1 | 3.053 |
| f2 | −4.726 |
| f3 | 2.836 |
| f4 | −4.188 |
| f5 | 16.230 |
| EFL | 3.42 |
| BFL | 0.792 |
| FNO | 2.8 |
| OAL | 4.842 |
| FOV | 79.5 |

Here, respective characteristics (radii of curvature, thicknesses, refractive indices, and Abbe numbers) of the lenses 110 to 150 are illustrated in FIG. 3.

In the first exemplary embodiment, the first lens 110 may have positive refractive power, and have a meniscus shape in which an object-side surface is convex. For example, a first surface of the first lens 110 maybe convex in the paraxial region, and a second surface of the first lens 110 may be concave in the paraxial region. However, the first lens 110 may have negative refractive power, and/or the image-side surface of the first lens may be convex on the optical axis.

The second lens 120 may have negative refractive power and have a meniscus shape in which an object-side surface is convex. For example, a first surface of the second lens 120 may be convex in the paraxial region, and a second surface of the second lens 120 may be concave in the paraxial region. However, the second lens 120 may have positive refractive power, the object-side surface of the second lens 120 may be concave on the optical axis and/or the image-side surface of the second lens 120 may be convex on the optical axis.

The third lens 130 may have positive refractive power and both surfaces thereof may be convex. For example, first and second surfaces of the third lens 130 may be convex in the paraxial region. However, the third lens 130 may have negative refractive power, and/or at least one of object-side and image-side surfaces of the third lens 130 may be concave on the optical axis.

The fourth lens 140 may have negative refractive power and have a meniscus shape in which an image-side surface is convex. For example, a first surface of the fourth lens 140 may be concave in the paraxial region, and a second surface of the fourth lens 140 may be convex in the paraxial region. However, the fourth lens 140 may have positive refractive power, the object-side surface of the fourth lens 140 may be convex on the optical axis, and/or the image-side surface of the fourth lens 140 may be concave on the optical axis.

The fifth lens 150 may have positive refractive power and have a meniscus shape in which an object-side surface is convex. For example, a first surface of the fifth lens 150 may be convex in the paraxial region, and a second surface of the fifth lens 150 may be concave in the paraxial region. Additionally, the first surface of the fifth lens 150 may be concave at the peripheral portion, and/or the second surface of the fifth lens 150 may be convex at the peripheral portion. However, the fifth lens 150 may have negative refractive power, the object-side surface of the fifth lens 150 may be concave on the optical axis, and/or the image-side surface of the fifth lens 150 may be convex. In addition, at least one or more inflection points may be formed on at least one or both of the first and second surfaces of the fifth lens 150.

Meanwhile, the respective surfaces of the first to fifth lenses 110 to 150 may have aspherical coefficients as illustrated in FIG. 4.

In addition, the stop may be disposed between the first and second lenses 110 and 120. However, the stop may be disposed in front of the first lens 110 or anywhere between the second lens 120 and the fifth lens 150.

Figure 2:
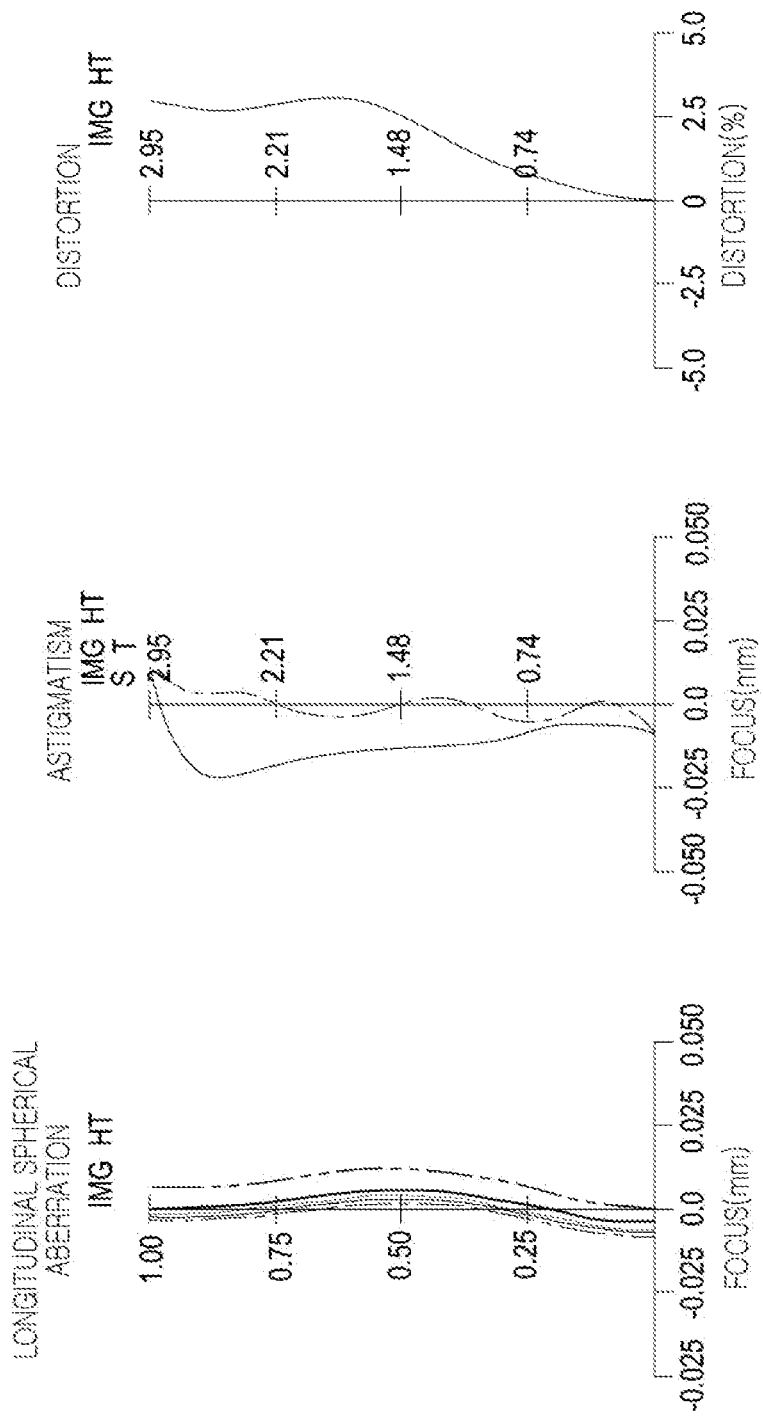
FIG. 2 is graphs having curves representing aberration characteristics of the optical system illustrated in FIG. 1.
Figure 5:
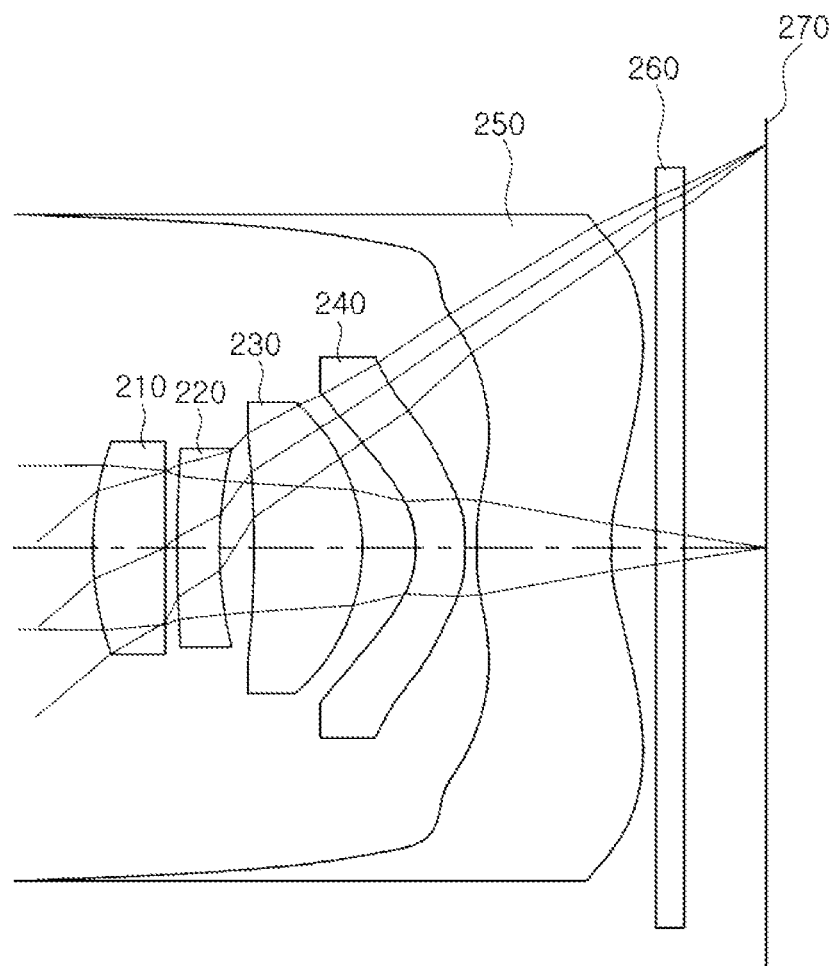
FIG. 5 is a view of an optical system according to a second exemplary embodiment in the present disclosure.

In addition, the optical system configured as described above may have aberration characteristics illustrated in FIG. 2.

An optical system according to a second exemplary embodiment in the present disclosure will be described with reference to FIGS. 5 through 8.

The optical system according to the second exemplary embodiment may include a first lens 210, a second lens 220, a third lens 230, a fourth lens 240, and a fifth lens 250, and may further include a stop, an infrared cut-off filter 260, and an image sensor 270.

For example, as illustrated in Table 2 (shown below), a focal length (f1) of the first lens 210 may be 3.108 mm, a focal length (f2) of the second lens 220 may be −4.968 mm, a focal length (f3) of the third lens 230 may be 3.029 mm, a focal length (f4) of the fourth lens 240 may be −5.079 mm, a focal length (f5) of the fifth lens 250 may be 22.884 mm, and an overall focal length (EFL) of the optical system may be 3.42 mm.

In addition, an Abbe number (v1) of the first lens 210 may be 49.2, f5/f1 may be 7.3618404, v1-v3 may be −6.9, Th2/Th5may be 0.3, OAL/EFL may be 1.4390405, Th5/f may be 0.292, a refractive index (n1) of the first lens 210 may be 1.743, r1/EFL may be 0.6913325, EFL/f1 may be 1.1002364, f1/f3 may be 1.0260681, and EFL/f1+|EFL/f2| may be 1.788605.

TABLE 2

| | |
|---|---|
| f1 | 3.108 |
| f2 | −4.968 |
| f3 | 3.029 |
| f4 | −5.079 |
| f5 | 22.884 |
| EFL | 3.42 |
| BFL | 0.792 |
| FNO | 2.8 |
| OAL | 4.922 |
| FOV | 79.6 |

Here, respective characteristics (radii of curvature, thicknesses, refractive indices, and Abbe numbers) of the lenses 210 to 250 are illustrated in FIG. 7.

In the second exemplary embodiment, the first lens 210 may have positive refractive power and both surfaces thereof may be convex. For example, first and second surfaces of the first lens 210 may be convex in the paraxial region. However, the first lens 210 may have negative refractive power, and/or at least one of object-side and image-side surfaces of the first lens 210 may be concave on the optical axis.

The second lens 220 may have negative refractive power and have a meniscus shape in which an object-side surface is convex. For example, a first surface of the second lens 220 may be convex in the paraxial region, and a second surface of the second lens 220 may be concave in the paraxial region. However, the second lens 220 may have positive refractive power, the object-side surface of the second lens 220 may be concave on the optical axis, and/or the image-side surface of the second lens 220 may be convex on the optical axis.

The third lens 230 may have positive refractive power and have a meniscus shape in which an image-side surface is convex. For example, a first surface of the third lens 230 may be concave in the paraxial region, and a second surface of the third lens 230 may be convex in the paraxial region. However, the third lens 230 may have negative refractive power, the object-side surface of the third lens 230 may be convex on the optical axis, and/or the image-side surface of the third lens 230 may be concave on the optical axis.

The fourth lens 240 may have negative refractive power and have a meniscus shape in which an image-side surface is convex. For example, a first surface of the fourth lens 240 may be concave in the paraxial region, and a second surface of the fourth lens 240 may be convex in the paraxial region. However, the fourth lens 240 may have positive refractive power, the object-side surface of the fourth lens 240 may be convex on the optical axis, and/or the image-side surface of the fourth lens 240 may be concave on the optical axis.

The fifth lens 250 may have positive refractive power and have a meniscus shape of which an object-side surface is convex. For example, a first surface of the fifth lens 250 may be convex in the paraxial region, and a second surface of the fifth lens 250 may be concave in the paraxial region. Additionally, the first surface of the fifth lens 250 may be concave at the peripheral portion, and/or the second surface of the fifth lens 250 may be convex at the peripheral portion. However, the fifth lens 250 may have negative refractive power, the object-side surface of the fifth lens 250 may be concave, and/or the image-side surface of the fifth lens 250 may be convex. In addition, at least one or more inflection points may be formed on at least one or both of the first and second surfaces of the fifth lens 250.

Meanwhile, the respective surfaces of the first to fifth lenses 210 to 250 may have aspherical coefficients as illustrated in FIG. 8.

In addition, the stop may be disposed between the first and second lenses 210 and 220. However, the stop may be disposed in front of the first lens 210 or anywhere between the second lens 220 and the fifth lens 250.

Figure 6:
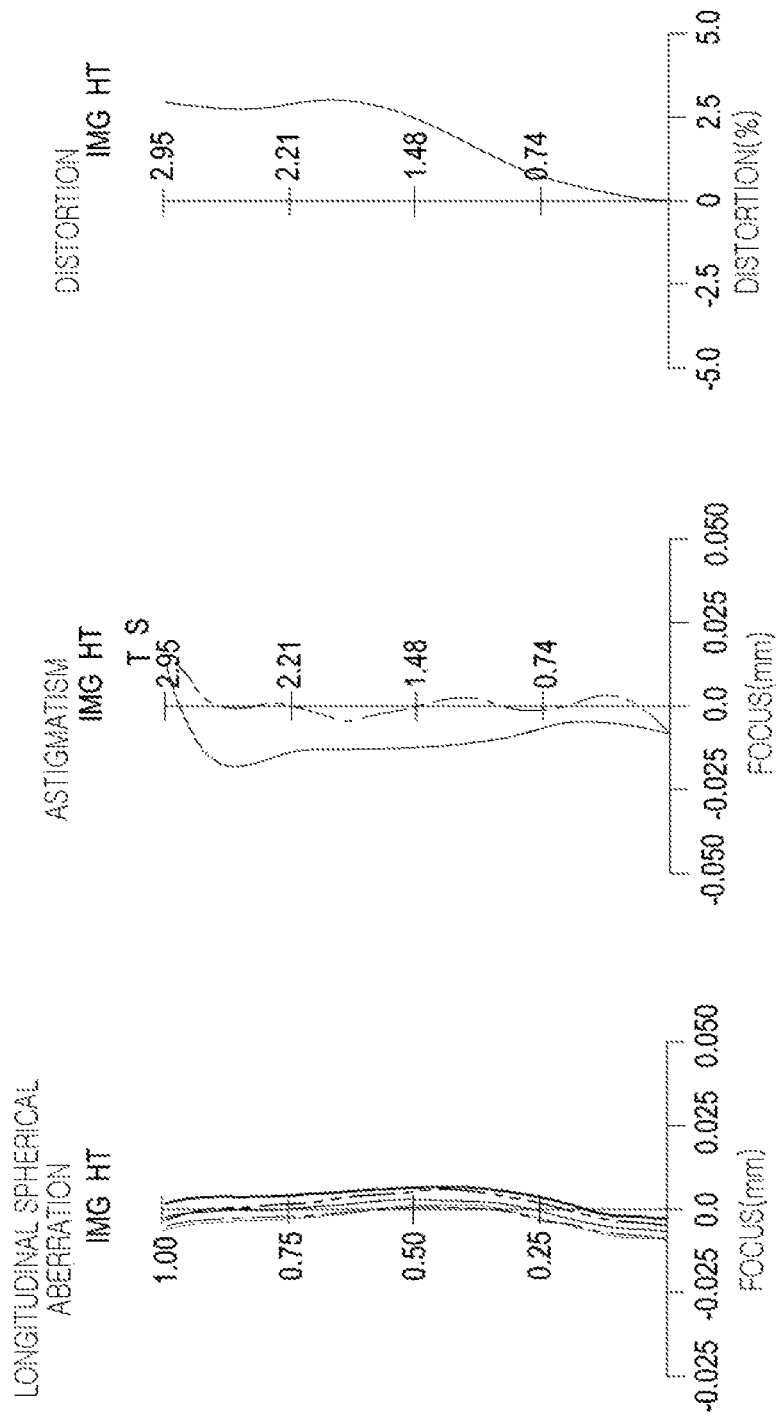
FIG. 6 is graphs having curves representing aberration characteristics of the optical system illustrated in FIG. 5.
Figure 9:
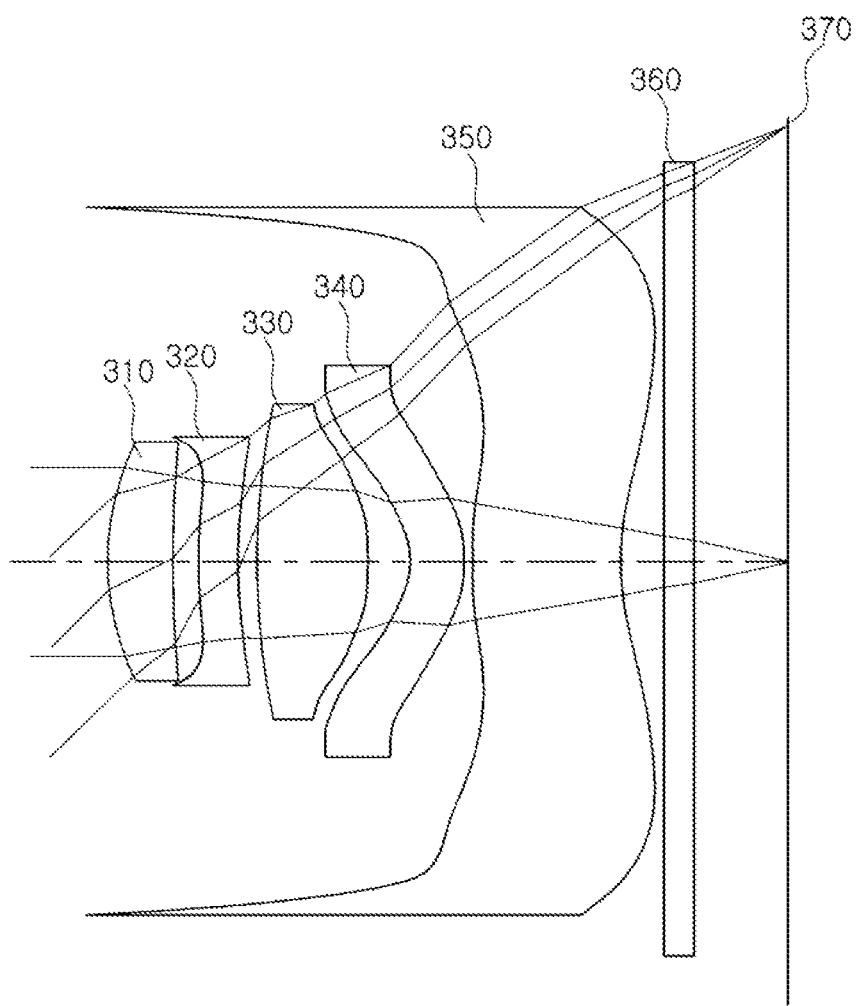
FIG. 9 is a view of an optical system according to a third exemplary embodiment in the present disclosure.

In addition, the optical system configured as described above may have aberration characteristics illustrated in FIG. 6.

An optical system according to a third exemplary embodiment in the present disclosure will be described with reference to FIGS. 9 through 12.

The optical system according to the third exemplary embodiment may include a first lens 310, a second lens 320, a third lens 330, a fourth lens 340, and a fifth lens 350, and may further include a stop, an infrared cut-off filter 360, and an image sensor 370.

For example, as illustrated in Table 3, a focal length (f1) of the first lens 310 may be 5.354 mm, a focal length (f2) of the second lens 320 may be −10.768 mm, a focal length (f3) of the third lens 330 may be 2.183 mm, a focal length (f4) of the fourth lens 340 may be −4.343 mm, a focal length (f5) of the fifth lens 350 may be 17.154 mm, and an overall focal length (EFL) of the optical system may be 3.05 mm.

In addition, an Abbe number (v1) of the first lens 310 maybe 44.9, f5/f1 may be 3.2040098, v1-v3 may be −11.2, Th2/Th5may be 0.247, OAL/EFL may be 1.5071724, Th5/f may be 0.332, a refractive index (n1) of the first lens 310 maybe 1.744, r1/EFL may be 0.6039019, EFL/f1 may be 0.5696767, f1/f3 may be 2.452596, and EFL/f1+|EFL/f2| may be 0.8529201.

TABLE 3

| | |
|---|---|
| f1 | 5.354 |
| f2 | −10.768 |
| f3 | 2.183 |
| f4 | −4.343 |
| f5 | 17.154 |
| EFL | 3.05 |
| BFL | 0.831 |
| FNO | 2.4 |
| OAL | 4.597 |
| FOV | 86.8 |

Here, respective characteristics (radii of curvature, thicknesses, refractive indices, and Abbe numbers) of the lenses 310 to 350 are illustrated in FIG. 11.

In the third exemplary embodiment, the first lens 310 may have positive refractive power, and have a meniscus shape in which an object-side surface is convex. For example, a first surface of the first lens 310 maybe convex in the paraxial region, and a second surface of the first lens 310 may be concave in the paraxial region. However, the first lens 310 may have negative refractive power, the object-side surface of the first lens 310 may be concave on the optical axis, and/or the image-side surface of the first lens 310 may be convex on the optical axis.

The second lens 320 may have negative refractive power and have a meniscus shape in which an object-side surface is convex. For example, a first surface of the second lens 320 may be convex in the paraxial region, and a second surface of the second lens 320 may be concave in the paraxial region. However, the second lens 320 may have positive refractive power, the object-side surface of the second lens 320 may be concave on the optical axis, and/or the image-side surface of the second lens 320 may be convex on the optical axis.

The third lens 330 may have positive refractive power and both surfaces thereof may be convex. For example, first and second surfaces of the third lens 330 may be convex in the paraxial region. However, the third lens 330 may have negative refractive power, and/or at least one of object-side and image-side surfaces of the third lens 330 may be concave.

The fourth lens 340 may have negative refractive power and have a meniscus shape in which an image-side surface is convex. For example, a first surface of the fourth lens 340 may be concave in the paraxial region, and a second surface of the fourth lens 340 may be convex in the paraxial region. However, the fourth lens 340 may have positive refractive power, the object-side surface of the fourth lens 340 may be convex on the optical axis, and/or the image-side surface of the fourth lens 340 may be concave on the optical axis.

The fifth lens 350 may have positive refractive power and have a meniscus shape in which an object-side surface is convex. For example, a first surface of the fifth lens 350 may be convex in the paraxial region, and a second surface of the fifth lens 350 may be concave in the paraxial region. Additionally, the first surface of the fifth lens 350 may be concave at the peripheral portion, and/or the second surface of the fifth lens 350 may be convex at the peripheral portion.

However, the fifth lens 350 may have negative refractive power, the object-side surface of the fifth lens 350 may be concave on the optical axis, and/or the image-side surface of the fifth lens 350 may be convex on the optical axis. In addition, at least one or more inflection points may be formed on at least one or both of the first and second surfaces of the fifth lens 350.

Meanwhile, the respective surfaces of the first to fifth lenses 310 to 350 may have aspherical coefficients as illustrated in FIG. 12.

In addition, the stop may be disposed between the first and second lenses 310 and 320. However, the stop may be disposed in front of the first lens 310 or anywhere between the second lens 320 and the fifth lens 350.

Figure 10:
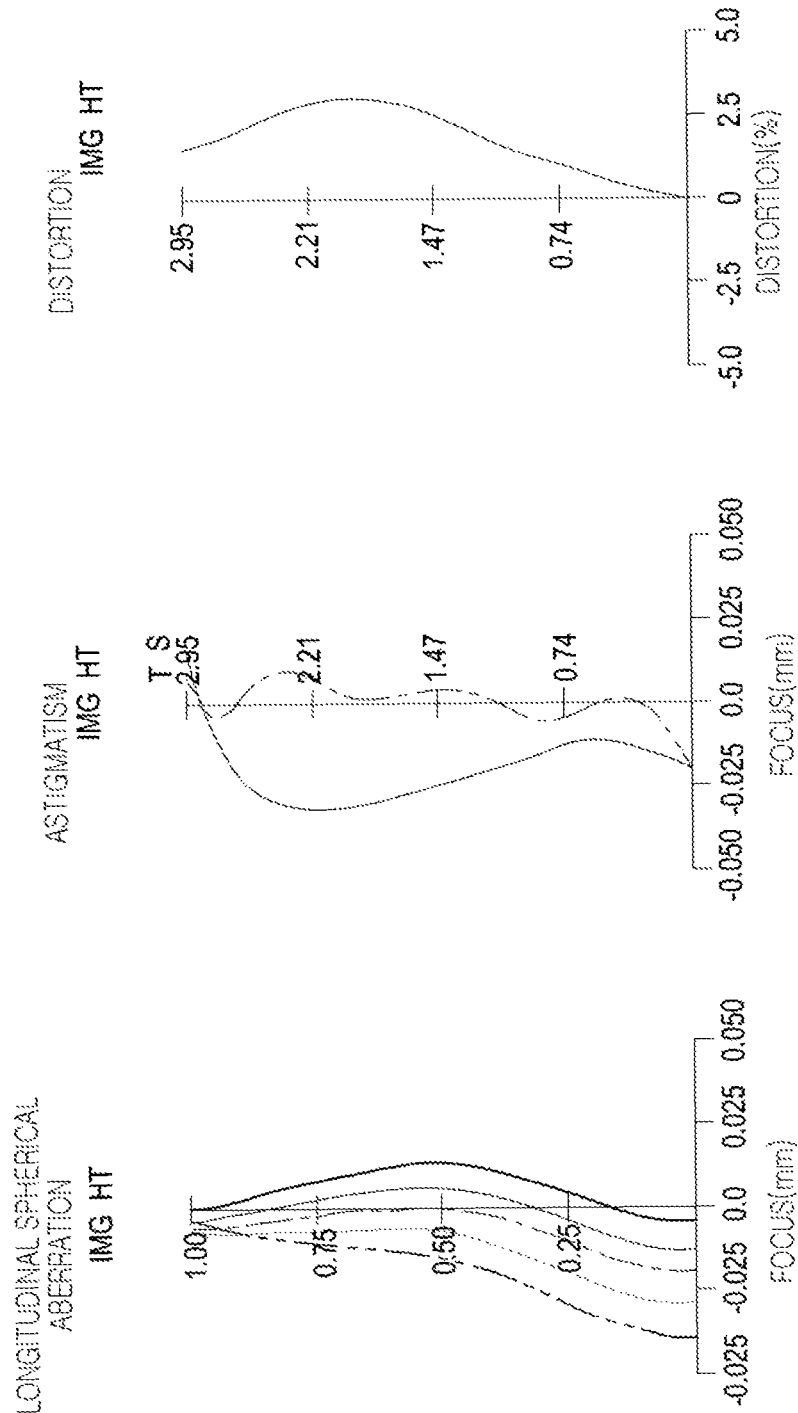
FIG. 10 is graphs having curves representing aberration characteristics of the optical system illustrated in FIG. 9.

In addition, the optical system configured as described above may have aberration characteristics illustrated in FIG. 10.

As set forth above, in the optical system according to some exemplary embodiments of the present disclosure, an aberration improvement effect, a high degree of resolution, and a wide field of view may be obtained.

Deteriorations in resolution at high temperatures and/or low temperatures may be decreased, and MTF performance may be maintained even during temperature changes. In addition, changes in focusing positions may be decreased.

While exemplary embodiments have been shown and described above, it will be apparent to those skilled in the art that modifications and variations could be made without departing from the scope of the present invention as defined by the appended claims.

What is claimed is:

1. An optical system comprising:
a first lens having refractive power and a convex object-side surface;
a second lens having refractive power and a convex object-side surface;
a third lens having refractive power;
a fourth lens having refractive power; and
a fifth lens having refractive power,
wherein the first to fifth lenses are sequentially disposed from an object side,
wherein the optical system has a total of five lenses
wherein an Abbe number of the first lens v1 satisfies:

$30<v1<50$, and wherein the Abbe number of the first lens v1 and an Abbe number of the third lens v3 satisfy:

$-20<v1-v3<-5$.

2. The optical system of claim 1, wherein a focal length of the first lens f1 and a focal length of the fifth lens f5 satisfy:

$f5/f1>0.3$.

3. The optical system of claim 1, wherein a thickness of the second lens Th2 and a thickness of the fifth lens Th5 satisfy:

$Th2/Th5<0.4$.

4. The optical system of claim 1, further comprising an image sensor converting an image of a subject incident through the first to fifth lenses into an electrical signal, wherein a distance from the object-side surface of the first lens to an imaging surface of the image sensor OAL and an overall focal length of the optical system EFL satisfy:

$1.0<OAL/EFL<2.0$.

5. The optical system of claim 1, wherein a thickness of the fifth lens Th5 and an overall focal length of the optical system EFL satisfy:

$0.2<Th5/EFL<0.4$.

6. The optical system of claim 1, wherein a refractive index of the first lens n1 satisfies:

$1.70<n1<2.10$.

7. The optical system of claim 1, wherein a radius of curvature of the object-side surface of the first lens r1 and an overall focal length of the optical system EFL satisfy:

$0.5<r1/EFL<0.7$.

8. The optical system of claim 1, wherein a focal length of the first lens f1 and an overall focal length of the optical system EFL satisfy:

$0.5<EFL/f1<1.2$.

9. The optical system of claim 1, wherein a focal length of the first lens f1 and a focal length of the third lens f3 satisfy:

$1<f1/f3<2.5$.

10. The optical system of claim 1, wherein a focal length of the first lens f1, a focal length of the second lens f2, and an overall focal length of the optical system EFL satisfy:

$0.8<EFL/f1+|EFL/f2|<1.9$.

11. The optical system of claim 1, wherein a field of view of the optical system FOV satisfies:

$75<FOV<90$.

12. The optical system of claim 1, wherein the refractive power of the first lens is positive.

13. The optical system of claim 1, wherein an image-side surface of the first lens is concave.

14. The optical system of claim 1, wherein an image-side surface of the first lens is convex.

15. The optical system of claim 1, wherein the refractive power of the second lens is negative.

16. The optical system of claim 1, wherein an image-side surface of the second lens is concave.

17. The optical system of claim 1, wherein the refractive power of the third lens is positive.

18. The optical system of claim 1, wherein an object-side surface of the third lens is convex.

19. The optical system of claim 1, wherein an object-side surface of the third lens is concave.

20. The optical system of claim 1, wherein an image-side surface of the third lens is convex.

21. The optical system of claim 1, wherein the refractive power of the fourth lens is negative.

22. The optical system of claim 1, wherein an object-side surface of the fourth lens is concave.

23. The optical system of claim 1, wherein an image-side surface of the fourth lens is convex.

24. The optical system of claim 1, wherein the refractive power of the fifth lens is positive.

25. The optical system of claim 1, wherein an object-side surface of the fifth lens is convex.

26. The optical system of claim 1, wherein an object-side surface of the fifth lens is concave.

27. The optical system of claim 1, wherein at least one inflection point is formed on at least one of an object-side surface and an image-side surface of the fifth lens.

28. The optical system of claim 1, wherein at least one of the object-side surface and an image-side surface of the first lens is aspherical.

29. The optical system of claim 1, further comprising a stop disposed between the first and second lenses.

30. The optical system of claim 1, wherein the first lens is formed of glass.

31. An optical system comprising:
a first lens having refractive power;
a second lens having refractive power and a convex object-side surface;
a third lens having refractive power;
a fourth lens having negative refractive power; and
a fifth lens having positive refractive power,
wherein the first to fifth lenses are sequentially disposed from an object side,
wherein the optical system has a total of five lenses,
wherein a refractive index of the first lens n1 satisfies:

$1.70<n1<2.10$, and wherein an Abbe number of the first lens v1 and an Abbe number of the third lens v3 satisfy:

$-20<v1-v3<-5$.

32. The optical system of claim 31, wherein an Abbe number of the first lens v1 satisfies:

$30<v1<50$.

33. The optical system of claim 31, wherein the first lens is formed of glass.

34. An optical system comprising:
a first lens having refractive power;
a second lens having refractive power and a convex object-side surface;
a third lens having refractive power and a convex object-side surface;
a fourth lens having refractive power; and
a fifth lens having positive refractive power and a concave image-side surface,
wherein the first to fifth lenses are sequentially disposed from an object side,
wherein the optical system has a total of five lenses,
wherein an Abbe number of the first lens v1 satisfies:

$30<v1<50$, and wherein the Abbe number of the first lens v1 and an Abbe number of the third lens v3 satisfy:

$-20<v1-v3<-5$.

35. An optical system comprising: first, second, third, fourth, and fifth lenses disposed sequentially from an object side, wherein the optical system has a total of five lenses, wherein an Abbe number of the first lens v1 is between 30 and 50 and wherein the Abbe number of the first lens v1 and an Abbe number of the third lens v3 satisfy:

$-20<v1-v3<-5$.

36. The optical system of claim 35, wherein the fifth lens has positive refractive power.

37. The optical system of claim 35, wherein an object-side surface of the third lens is convex.

38. The optical system of claim 35, wherein the first lens is formed of glass with a refractive index between 1.7 and 2.1.

* * * * *